[12] United States Patent  
Mitchell et al.

(10) Patent No.: US 9,425,575 B2  
(45) Date of Patent: Aug. 23, 2016

(54) GENERATING BROADBAND LIGHT DOWNHOLE FOR WELLBORE APPLICATION

(71) Applicant: Halliburton Energy Services, Inc., Houston, TX (US)

(72) Inventors: Ian Bradford Mitchell, Katy, TX (US); Mikko Jaaskelainen, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 347 days.

(21) Appl. No.: 13/915,166

(22) Filed: Jun. 11, 2013

(65) Prior Publication Data

US 2014/0362431 A1    Dec. 11, 2014

(51) Int. Cl.

| H01S 3/10 | (2006.01) |
| G02F 1/35 | (2006.01) |
| H01S 3/00 | (2006.01) |
| E21B 47/12 | (2012.01) |
| H01S 3/067 | (2006.01) |
| H01S 3/094 | (2006.01) |
| H01S 3/16 | (2006.01) |

(52) U.S. Cl.  
CPC ............. *H01S 3/0092* (2013.01); *E21B 47/123* (2013.01); *H01S 3/0675* (2013.01); *H01S 3/094053* (2013.01); *H01S 3/1616* (2013.01)

(58) Field of Classification Search  
None  
See application file for complete search history.

(56) References Cited

U.S. PATENT DOCUMENTS

| 5,218,665 A * | 6/1993 | Grasso et al. ................. 385/142 |
| 7,715,459 B2 | 5/2010 | Brown et al. |
| 2003/0008448 A1 * | 1/2003 | Kafka et al. ................. 438/200 |
| 2003/0053198 A1 | 3/2003 | Islam |
| 2004/0027648 A1 * | 2/2004 | Furukawa et al. ............ 359/328 |
| 2007/0062696 A1 | 3/2007 | Wilson et al. |
| 2008/0013163 A1 | 1/2008 | Leonardo et al. |
| 2009/0185588 A1 | 7/2009 | Munroe |
| 2011/0297372 A1 * | 12/2011 | Maida et al. ............... 166/255.2 |
| 2012/0027031 A1 * | 2/2012 | Liu ..................... G02F 6/02214 372/6 |
| 2012/0236314 A1 * | 9/2012 | Fermann ................. G02F 1/365 356/479 |
| 2013/0070472 A1 * | 3/2013 | Maxik et al. ................... 362/554 |
| 2013/0188660 A1 * | 7/2013 | Shaw .................... H01S 3/0057 372/25 |
| 2014/0092620 A1 * | 4/2014 | Tissot ........................... 362/553 |
| 2014/0175272 A1 * | 6/2014 | Samson ............... G02F 1/0115 250/269.1 |

OTHER PUBLICATIONS

Authorized Officer Jong Kyung Lee, PCT International Search Report and Written Opinion of the International Searching Authority, PCT/US2014/037574, Sep. 15, 2014, 12 pages.

Wu, Jianfeng, et al., "Single frequency fiber laser at 2.05 μm based on Ho-doped germanate glass fiber," Fiber Lasers VI: Technology, Systems, and Applications, 2009, Proc. of SPIE vol. 7195, 71951K-1, 7 pages.

Creeden, Daniel, et al., "Thulium Fiber Laser-Pumped Mid-IR OPO," Laser Source Technology for Defense and Security IV, Proc. of SPIE ol. 6952, 69520S (2008), 7 pages.

(Continued)

*Primary Examiner* — Hemang Sanghavi  
(74) *Attorney, Agent, or Firm* — Benjamin Fite; Fish & Richardson P.C.

(57) ABSTRACT

Generating broadband light downhole for wellbore application. A laser source is configured to reside outside a wellbore and produce a seed light pulse at a first wavelength spectrum. A converter is configured to be received inside the wellbore, remote from the laser source. The converter receives the seed light pulse at the first wavelength spectrum through one or more fiber optic cables, and generates light at a second wavelength spectrum that has a broader range than the first wavelength spectrum.

20 Claims, 3 Drawing Sheets

(56) References Cited

OTHER PUBLICATIONS

Hilligsoe, Karen Marie, et al., "Supercontinuum generation in a photonic crystal fiber with two zero dispersion wavelengths," Optics Express, vol. 12, No. 6, Mar. 22, 2004, 10 pages.

PCT International Preliminary Report on Patentability, PCT/US2014/037574, Dec. 23, 2015, 8 pages.
Australian Government IP Australia, Patent Examination Report No. 1, Australian Application No. 2014278696, May 16, 2016.

* cited by examiner

GENERATING BROADBAND LIGHT DOWNHOLE FOR WELLBORE APPLICATION

TECHNICAL FIELD

This disclosure relates to fiber optic systems used, for example, in wellbores.

BACKGROUND

Fiber optic cables are used to transmit light in fiber-optic communications and optical sensing. For example, in optical sensing, light can represent various signal types, such as temperature, pressure, strain, acceleration, and the like. In some applications, optical sensing can be used in a wellbore by communicating light between a source and downhole sensors or actuators (or both). The fiber optic cables can be embedded in the wellbore's casing, or run down into the wellbore with a well tool (e.g., a logging tool string in a drill pipe string). As light passes through a fiber optic cable, some photons are lost to natural fiber attenuation through imperfections, impurities, and natural scattering processes. The rate at which photons are lost depends on factors including wavelength, hydrogen ingression and bending loss. Loss of photons affects a wavelength of light available downhole for sensing applications.

BRIEF DESCRIPTION OF THE DRAWINGS

Like reference numbers and designations in the various drawings indicate like elements.

DETAILED DESCRIPTION

This disclosure relates to generating broadband light downhole for wellbore applications. The broadband light can be suitable for sensing applications at remote, e.g., downhole, locations. Light in the 2-3 µm spectrum is suitable for chemical sensing applications. However, it may not be feasible to transmit such broadband light across long distances, e.g., the depth of a wellbore, because wavelength dependent effects may degrade the spectral profile. Light at a wavelength longer than 1600 nm often experiences loss at a rate that makes transmitting the light over long distances, e.g., of the order of several kilometers, difficult. Because the broadband light cannot be transmitted to downhole locations without attenuation, the light may be unavailable for certain sensing applications at the downhole locations.

This disclosure describes techniques to create and transmit a light pulse to a downhole location, and then broaden the light pulse downhole into a broader band at the downhole location. While described in the context of a wellbore, the techniques described here can be applied in any environment in which broadband light is applied at a location that is at a distance from the source of the light. Light at a wavelength that can be transmitted long distances without significant attenuation is generated and transmitted to a downhole location. At the remote location, the light is converted to a broadband wavelength. By doing so, broadband light without significant attenuation can be made available at the downhole locations. Transmitting broadband light downhole can enable performing downhole operations, e.g., downhole spectrometry and other sensing techniques, in which broadband light at wavelengths outside the infrared range are applied.

As described below, fiber amplifiers which consist of a rare earth ion doped optical fiber are pumped at a specific wavelength known to excite the ions. A seed light pulse is passed through this fiber at a photon energy that is equal to a difference between excited and ground states of the dopant resulting in stimulated emission resulting in an amplification of the seed light pulse in a first wavelength spectrum. The intense and coherent seed light pulse is broadened to a second wavelength spectrum that is broader than the first wavelength spectrum using highly non-linear optical materials, e.g., photonic crystal fibers. Broadening can be achieved, e.g., by stimulated Raman scattering and self/cross-phase modulation that drives the broadening.

Figure 1:
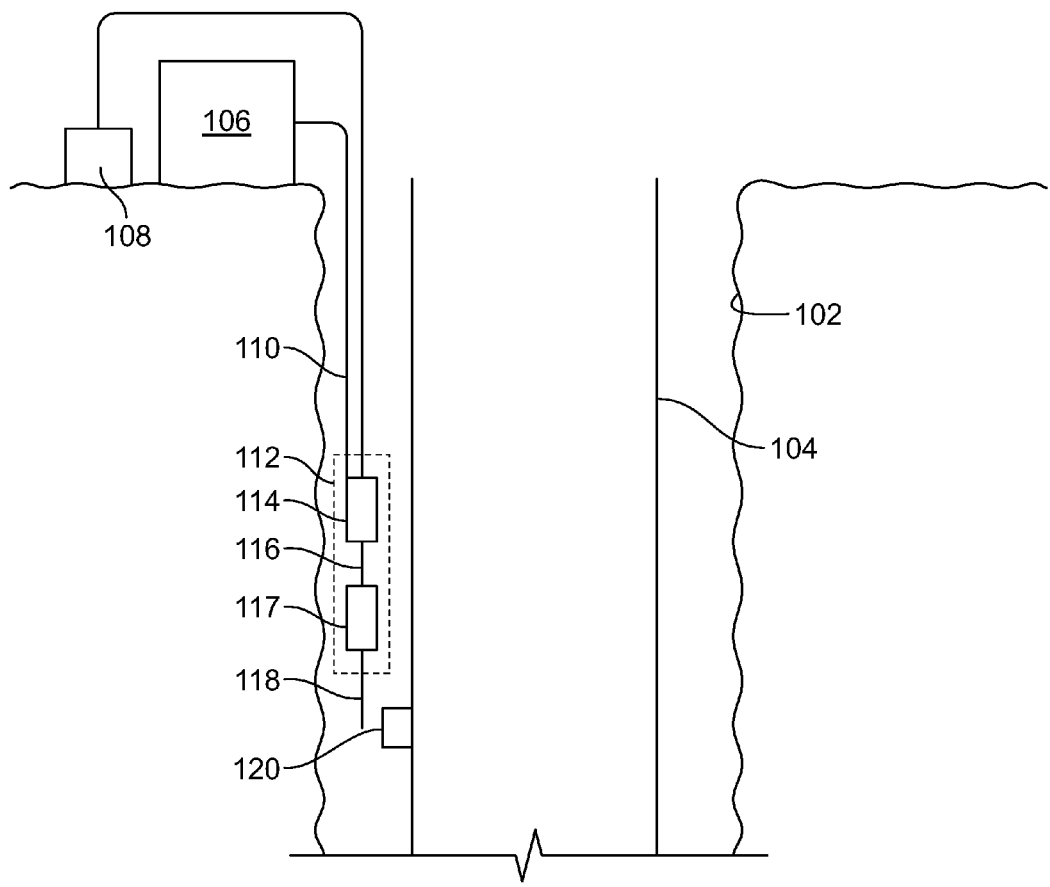
FIG. 1 illustrates an example system for producing broadband light in a wellbore.
Figure 2:
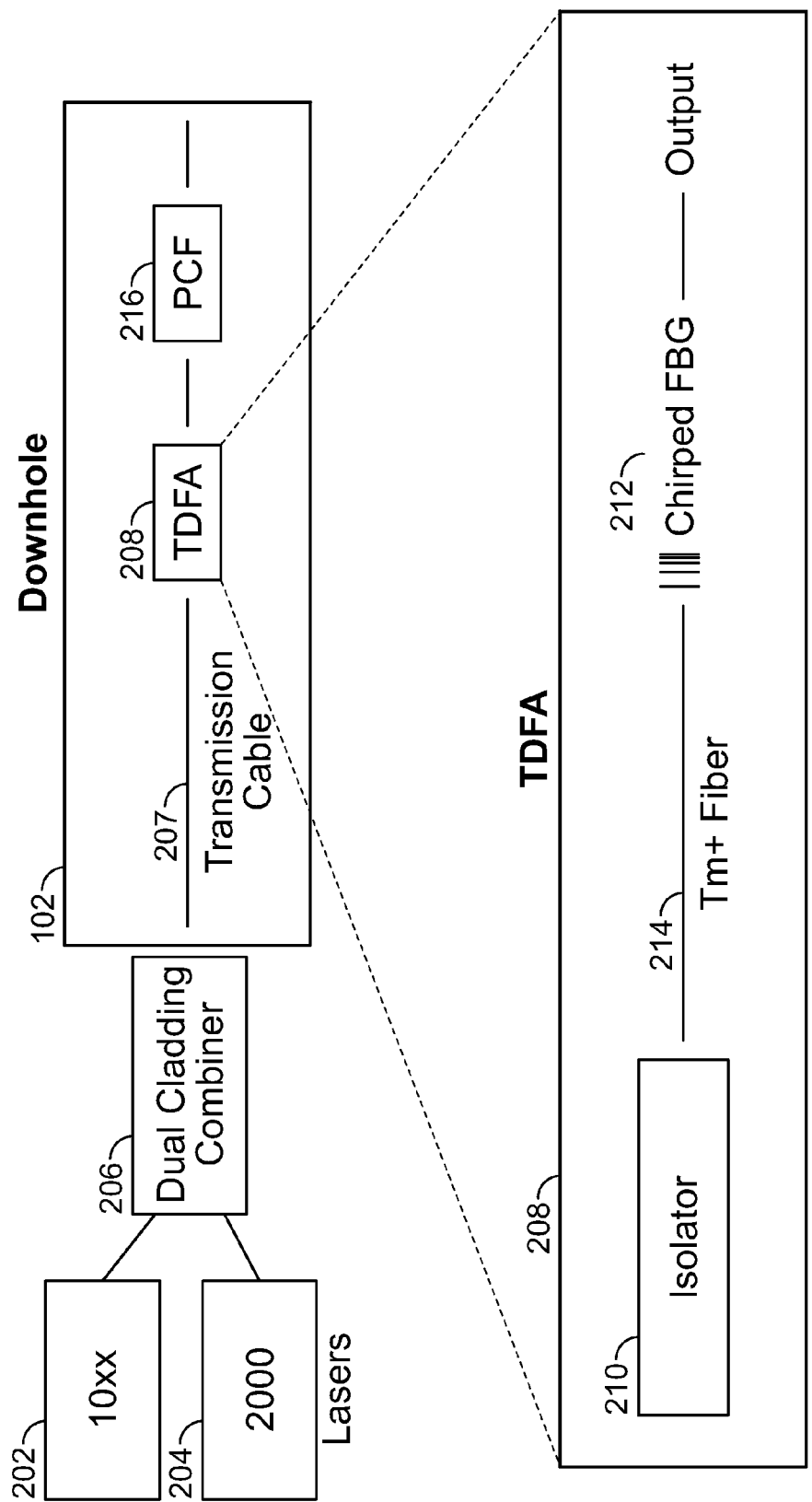
FIG. 2 illustrates an example system for producing broadband light in a wellbore.

FIGS. 1 and 2 illustrate an example system for producing broadband light in a subterranean wellbore 102. As described above, broadband light can be suitable for sensing applications at remote, downhole locations in a wellbore. FIGS. 1 and 2 illustrate an example laser source that is disposed at a location (e.g., a surface outside the wellbore) that is remote from the location or locations at which the broadband light is used, e.g., for sensing applications. Transmitting the broadband light from the location of the laser source to the remote, downhole locations without attenuation (or with an acceptable level of attenuation) of the broadband light can be expensive. Alternatively or in addition, such transmission can require non-standard fiber optic systems, laser sources, other equipments, or combinations of them. As described below, the laser source at the surface, outside the wellbore 102 produces a seed light pulse that is amplified downhole and then broadened into the broadband light that is used at the downhole, remote locations. Doing so can overcome the signal attenuation issues.

Figure 3:
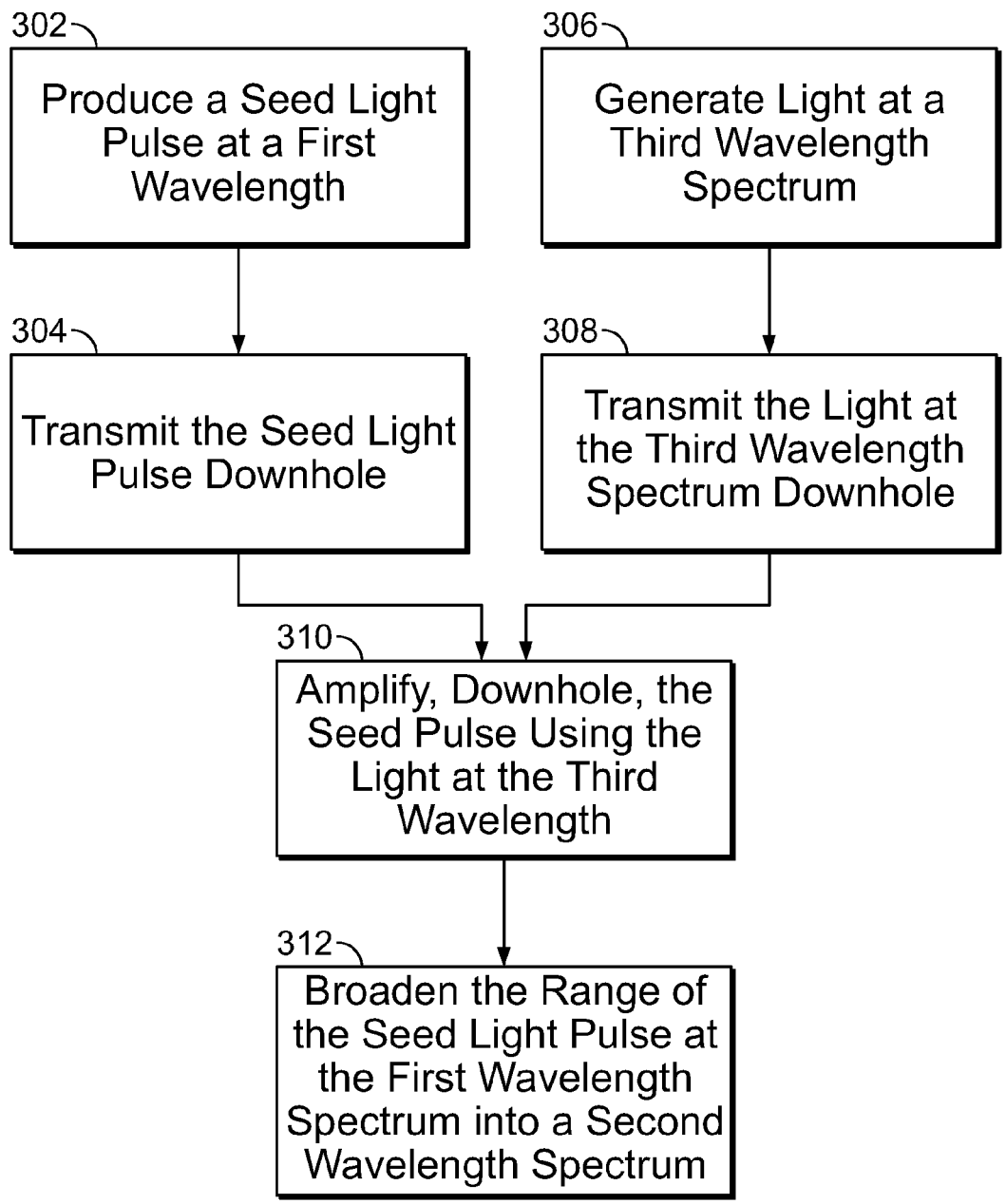
FIG. 3 is a flowchart of an example process for producing broadband light in a wellbore.

FIGS. 1 and 2 show an example location of the laser source and example remote, downhole sensing location at which the broadband light is used. In some implementations, the laser source can be disposed inside of the wellbore 102, e.g., part way between the surface and the downhole, remote locations at which the broadband light is used. FIG. 3 is a flowchart of an example process 300 for producing broadband light in the wellbore 102 that includes a casing 104. At 302, a seed light pulse is produced at a first wavelength, and, at 304, transmitted downhole. As described below, the seed light pulse at the first wavelength spectrum is converted into light at a second wavelength spectrum that has a broader range than the first wavelength spectrum.

A laser pulse generator 108 at the surface can produce the seed light pulse. At 306, light at a third wavelength spectrum is generated at a terranean surface outside of the wellbore 102. In some implementations, the laser source 106 includes a laser 202, e.g., a 1064 wavelength, 50 W continuous wave laser, to generate a first light and a laser 204, e.g., a 2.0 µm and 30 W peak, 30 ns pulse laser, to generate a second light. A combiner 206, e.g., a dual cladding combiner, receives and combines the first light and the second light into the light at the third wavelength spectrum. In some implementations, the first wavelength spectrum is substantially 800 nm or substantially 1 µm to 1.08 µm continuous wave. Although described as two lasers, in other instances, one laser or more than two lasers can be used to generate the light at the first wavelength spectrum.

At 308, the light at the third wavelength spectrum is transmitted downhole into the wellbore 102. The pump light is transmitted from the laser source 106 along a fiber optic cable 110. For example, the fiber optic cable 110 can include a dual cladding 9/105/125 fiber 207. In some implementations, the fiber optic cable 110 can be disposed in a metal tube, e.g., a Fiber in Metal Tube (FIMT).

At 310, the seed light pulse at the first wavelength that is transmitted downhole is amplified, at the downhole location, using the light at the third wavelength spectrum. As described above, the seed light pulse has a photon energy equal to a difference between excited and ground states of the dopant in the fiber optic cable 110 resulting in a stimulated emission that amplifies the seed light pulse. In some implementations, a downhole module 112 is disposed at the downhole location to receive the seed light pulse at the first wavelength spectrum. To achieve supercontinuum generation, the peak power of light leaving the downhole module 112 can be over a kilowatt. The laser source 106 can have sufficient power to achieve this supercontinuum generation. In some implementations, the peak power level of the laser source can be between 30 W and 100 W.

The downhole module 112 includes an amplifier 114 and a fiber optic cable 116, which exhibits strong absorption at the third wavelength spectrum. For example, the amplifier 114 can be a Thulium-doped Fiber Amplifier (TDFA) 208, and the fiber optic cable 116 can be a Thulium doped dual clad fiber. When the seed light pulse is delivered to the amplifier 114, stimulated emission will occur increasing a power of the seed light pulse at the first wavelength spectrum from the first power to a second power that is greater than the first power. In some implementations, all the Thulium-doped fiber can be contained inside the amplifier 114. The fiber optic cable 116 can deliver light to a converter 117 (described below) for broadening. In such implementations, the fiber optic cable 116 need not be specially doped.

In some implementations, the TDFA 208 can include an isolator 210 and Fiber Bragg Grating (FBG) 212 to enhance performance by reflecting the light at the third wavelength spectrum to make more than one pass between the TDFA 208 and the laser source 106 through the active fiber area 214. The FBG can be a chirped FBG or natural FBG, which has a narrower reflection spectrum relative to chirped FBG. The active fiber area 214 can include a length, e.g., 10 m, of 9/105/125 Thulium+ doped fiber. The fiber optic cable in the active fiber area 214 can also include air holes. The example system in FIGS. 1 and 2 show a single amplification stage. Some implementations can include multiple amplification stages. For example, an output of a first amplification stage can be fed as a seed light pulse for a second amplification stage, which includes a corresponding laser source and optical fiber.

At 312, the range of the seed light pulse at the first wavelength spectrum can be broadened into light at a second wavelength spectrum that is broader in range than the first wavelength spectrum. A converter 117 is disposed at the downhole location to receive the amplified light, e.g., the seed light pulse in the 2 μm wavelength, from the amplifier 114 and to convert the seed light pulse into the light at the second wavelength by broadening the light at the first wavelength into a supercontinuum. To convert the light, the converter 117 can include a photonic crystal fiber (PCF) 216 of appropriate length and zero dispersion wavelength of substantially 2 μm. Different photonic crystal fibers can be implemented to convert the light based on different gradients of index of the fibers. In some implementations, the second wavelength spectrum can be shifted to a fourth wavelength spectrum that is different from the second by shifting a frequency of the light at the second wavelength spectrum to obtain the desired range, i.e., the light at the second wavelength spectrum. The frequency can be shifted up or down. The fourth wavelength spectrum may or may not have the same range as the second wavelength spectrum, but will have a broader range than the first wavelength spectrum.

With the configuration described here, a pulse peak power on the order of 1 kW can be provided to the converter 117 to generate broadband light having a wavelength that is between two and four times greater than a wavelength of the seed light pulse transmitted downhole from the laser source 106 at a distance of up to 5 km from the laser source 106. For example, for a first wavelength spectrum of approximately 800 nm, the second wavelength spectrum of the broadband light can be in the 2 μm to 3 μm range. The broadband light output by the converter 117 is passed to an output fiber optic cable 118 and delivered to a target 120, e.g., an optical sensor disposed downhole at a location on the casing 104. Back scattered light from the target 120 can be transmitted to the surface, e.g., to a spectrometer (not shown) that receives and evaluates the back scattered light.

A choice of the first wavelength spectrum can depend on a dopant in the fiber optic cable through which the light is transmitted downhole to the remote location. The wavelength of 800 nm is chosen for Thulium doped fiber. A different wavelength can be chosen for fiber optic cables with different dopants, e.g., 1150 nm for Homium doped fiber.

Complete inversion can be achieved by using a pump power of less than 300 mW/m at 1064 nm due to the weak absorption at this wavelength. This value corresponds to stored energy of approximately 8 μJ/m with dopant concentrations of substantially 1000 ppm. At 30% conversion efficiency, a 10 m fiber will provide 24 μJ or 800 W peak power in a 30 nm pulse, provided initial seed light pulse power is of sufficient magnitude, e.g., with a peak of a few watts. In some implementations, Raman suppression techniques can be incorporated to mitigate a movement of photon energies outside the Thulium absorption band resulting in lower power conversion efficiency.

A number of implementations have been described. Nevertheless, it will be understood that various modifications may be made without departing from the spirit and scope of the disclosure.

What is claimed is:

1. A system for producing broadband light in a wellbore, the system comprising:
    a laser source that produces a seed light pulse at a first wavelength spectrum; and
    a converter configured to be received in a wellbore, the laser source adapted to reside remote from the converter, the converter to receive the seed light pulse at the first wavelength spectrum and generate light at a second wavelength spectrum that has a broader range than the first wavelength spectrum.

2. The system of claim 1, wherein the laser source is configured to reside outside the wellbore.

3. The system of claim 2, wherein the seed light pulse at the first wavelength spectrum has a first power, the system further comprising an amplifier configured to be received downhole, the amplifier to amplify the seed light pulse at the first wavelength spectrum to a second power greater than the first power, wherein the converter broadens the seed light pulse having the second power into the light at the second wavelength spectrum.

4. The system of claim 3, further comprising a fiber optic cable including an inner core and an outer core to carry the seed light pulse at the first wavelength spectrum through the inner core and a light at a third wavelength through the outer core.

5. The system of claim 3, further comprising a laser source at the surface to produce the light at the third wavelength, wherein the fiber optic cable is configured to absorb the light at the third wavelength to amplify the seed light pulse.

6. The system of claim 5, wherein the laser source to produce the light at the third wavelength includes a first laser to generate a first light, a second laser to generate a second light, and a combiner to combine the first light and the second light into the light at the third wavelength spectrum.

7. The system of claim 5, further comprising a Fiber Bragg Grating to reflect the light at the third wavelength to make more than one pass between the amplifier and the laser source to produce the light at the third wavelength.

8. The system of claim 3, wherein the fiber optic cable is doped with a rare earth ion configured to absorb the light at the third wavelength.

9. The system of claim 8, wherein the fiber optic cable includes a dual cladding 9/105/125 fiber disposed in a metal tube.

10. A method for producing broadband light in a wellbore, the method comprising:
   generating a seed light pulse at a first wavelength spectrum outside a wellbore;
   transmitting the seed light pulse at the first wavelength spectrum to a downhole location inside the wellbore; and
   at the downhole location, converting the seed light pulse at the first wavelength spectrum into light at a second wavelength spectrum that has a broader range than the first wavelength spectrum.

11. The method of claim 10, wherein the seed light pulse at the first wavelength spectrum has a first power, the method further comprising:
   amplifying, downhole, the seed light pulse at the first wavelength spectrum to a second power greater than the first power; and
   broadening the seed light pulse at the second power into the light at the second wavelength spectrum.

12. The method of claim 11, wherein the second wavelength spectrum is substantially between two and four times greater than the first wavelength spectrum.

13. The method of claim 11, wherein broadening the seed light pulse having the second power into the light at the second wavelength spectrum comprises broadening the seed light pulse having the second power into a supercontinuum.

14. The method of claim 11, further comprising receiving the seed light pulse at the first wavelength spectrum and light at a third wavelength spectrum using a doped optical fiber that exhibits absorption at the third wavelength spectrum.

15. The method of claim 14, further comprising producing the light at the third wavelength spectrum, wherein the seed light pulse is amplified to generate the light having the second power in response to an absorption of the light at the third wavelength spectrum by the doped optical fiber.

16. The method of claim 14, further comprising reflecting the light at the third wavelength spectrum using a Fiber Bragg Grating before amplifying the seed light pulse.

17. The method of claim 14, further comprising transmitting the light at the third wavelength spectrum through an outer core of a fiber optic cable and the seed light pulse through an inner core of the fiber optic cable to the doped optical fiber.

18. The method of claim 14, wherein generating the light at the third wavelength spectrum at the surface comprises:
   generating a first light;
   generating a second light; and
   combining the first light and the second light into the light at the third wavelength spectrum.

19. A system for producing broadband light in a wellbore, the system comprising:
   a laser pulse generator adapted to reside at a surface outside a wellbore that produces a seed light pulse at a first wavelength spectrum, the seed light pulse having a first power;
   a laser source to generate a light at a third wavelength spectrum of lesser wavelength than the first wavelength spectrum;
   a downhole amplifier to amplify the seed light pulse into a pulse at the first wavelength spectrum, the pulse having a second power that is greater than the first power; and
   a downhole converter adapted to reside downhole inside the wellbore, the downhole converter to broaden the pulse having the second power into light at a second wavelength that has a broader range than the pulse at the first wavelength spectrum.

20. The system of claim 19, further comprising a doped optical fiber that exhibits absorption at the third wavelength spectrum, the doped optical fiber connected to the downhole amplifier to receive the light at the third wavelength spectrum.

* * * * *